United States Patent
Weymouth, Jr.

(10) Patent No.: US 7,763,191 B2
(45) Date of Patent: Jul. 27, 2010

(54) METHOD AND APPARATUS FOR PERFORMING AN IN-MOLD COINING OPERATION

(75) Inventor: Russell F. Weymouth, Jr., Charlton, MA (US)

(73) Assignee: Gentex Optics, Inc., Simpson, PA (US)

( * ) Notice: Subject to any disclaimer, the term of this patent is extended or adjusted under 35 U.S.C. 154(b) by 1071 days.

(21) Appl. No.: 11/140,435

(22) Filed: May 27, 2005

(65) Prior Publication Data

US 2006/0267226 A1 Nov. 30, 2006

(51) Int. Cl.
*B29C 45/03* (2006.01)
*G02C 7/02* (2006.01)

(52) U.S. Cl. .................. 264/2.2; 264/297.2; 264/328.7; 425/555

(58) Field of Classification Search .................. 264/2.2, 264/2.5, 297.2, 328.7, 328.11
See application file for complete search history.

(56) References Cited

U.S. PATENT DOCUMENTS

| | | | |
|---|---|---|---|
| 2,443,826 A | | 6/1948 | Johnson |
| 2,516,373 A | * | 7/1950 | Ehlert et al. ............... 425/394 |
| 3,147,657 A | * | 9/1964 | Williamson ................. 83/140 |
| 3,387,334 A | | 6/1968 | Belanger et al. |
| 4,184,835 A | | 1/1980 | Talbot |
| 4,364,878 A | | 12/1982 | Laliberte et al. |
| 4,900,242 A | | 2/1990 | Maus et al. |
| 5,015,426 A | | 5/1991 | Maus et al. |
| 5,123,833 A | * | 6/1992 | Parker ......................... 425/557 |
| 5,173,100 A | | 12/1992 | Shigyo et al. |
| 5,415,817 A | | 5/1995 | Shiao et al. |
| 5,417,899 A | | 5/1995 | Kitamura |
| 5,620,635 A | | 4/1997 | DeRozier et al. |
| 5,968,439 A | | 10/1999 | Grove |
| 5,972,252 A | | 10/1999 | Saito et al. |
| 6,156,242 A | | 12/2000 | Saito et al. |
| 6,162,376 A | * | 12/2000 | Mead ........................... 264/2.4 |
| 6,284,162 B1 | | 9/2001 | Kingsbury et al. |
| 6,499,986 B1 | * | 12/2002 | Saito .......................... 425/190 |
| 6,616,868 B1 | | 9/2003 | Gotoh et al. |
| 6,669,460 B1 | | 12/2003 | Tai et al. |
| 2002/0185757 A1 | | 12/2002 | Dubey et al. |
| 2004/0096539 A1 | | 5/2004 | McCaffrey et al. |

FOREIGN PATENT DOCUMENTS

| | | |
|---|---|---|
| JP | 54148055 | 11/1979 |
| JP | 60009722 | 1/1985 |
| JP | 60122128 | 6/1985 |
| JP | 4097812 | 3/1992 |
| WO | WO 00/71331 | 11/2000 |

OTHER PUBLICATIONS

Bingfeng Fan et al., "Simulation of Injection-Compression Molding for Optical Media"; Polymer Engineering and Science; Mar. 2003, vol. 43, No. 3; pp. 596-606.

* cited by examiner

*Primary Examiner*—Matthew J. Daniels
(74) *Attorney, Agent, or Firm*—Keusey & Associates, P.C.

(57) ABSTRACT

A hardware configuration and related method for performing a coining-type injection compression operation. The invention is useful in molding lenses since lenses have different thicknesses at various points. The equipment maintains the mold in a closed position during the entire molding cycle. A two part standoff post is designed to provide for slight axial compression during high injection pressure. The standoff post also provides a convenient mounting surface near the parting line to install inserts at various heights.

21 Claims, 3 Drawing Sheets

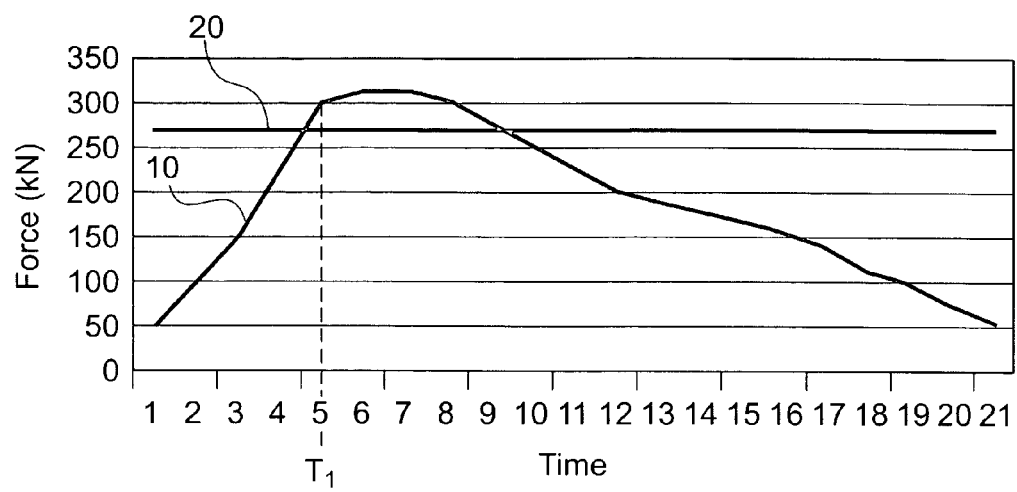
FIG. 1 - Prior Art
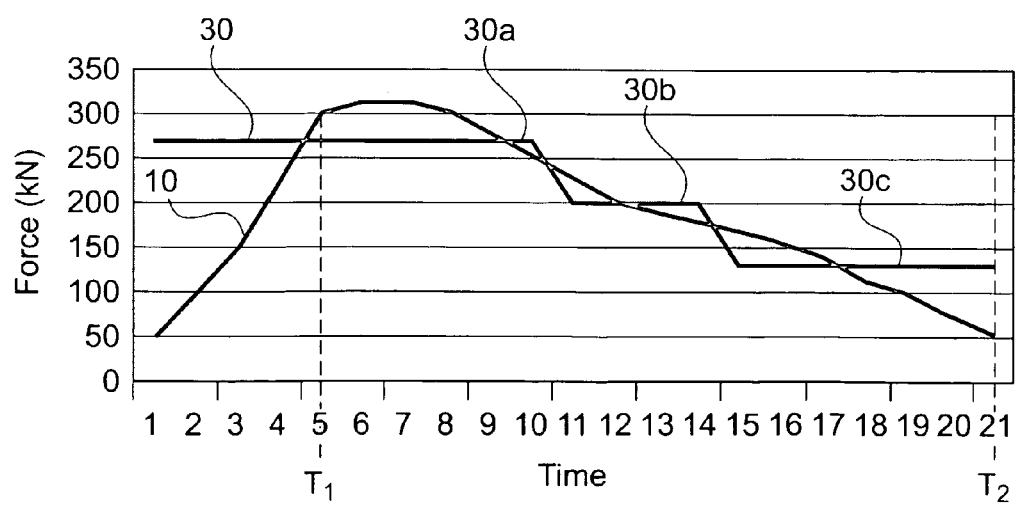
FIG. 2 - Prior Art

METHOD AND APPARATUS FOR PERFORMING AN IN-MOLD COINING OPERATION

BACKGROUND OF THE INVENTION

1. Field of the Invention

The invention relates to a method and apparatus for injection-compression molding that provides the benefits of a coining operation without opening the mold.

2. The Prior Art

U.S. Pat. No. 5,417,899 and the article, Simulation of Injection-Compression Molding for Optical Media by Fan, et al, describe the prior art coining operation whereby the mold is opened at the parting line by the internal cavity pressure exceeding the clamp force. The article describes coining as a process where, the thickness of the mold cavity is set to be slightly less than the nominal thickness of the part initially. As the screw moves forward, the cavity pressure and the mold cavity force exerted on the machine platen increase. When the force exerted by the melt on the mold is higher than the clamp force set on the machine, the mold is blown open to decrease the cavity pressure. As the screw moves past a machine setpoint, the process switches from a volumetric flow rate condition to a packing pressure condition applied at the nozzle. During both the filling and packing stages, a balance is maintained between the mold cavity force and the clamp force. When the former is lower than the latter, the mold starts to close. This continuous mold opening and closing, often referred to as "mold breathing," is distinctive from injection molding and improves the mold filling and the replication of grooves or pits at the surface of the discs, and also reduces the packing pressure and residual stress in the part. For this type of injection-compression molding, the clamp tonnage rather than the displacement is the set parameter on the machine as a function of time.

Because of the mold breathing for coining, injection-compression molding offers the advantages of lower packing pressure, homogeneous part quality, lower residual stress, and higher dimensional accuracy over the conventional injection molding, and is well suited for manufacturing extremely thin parts or complex-shaped parts, for which conventional injection molding either can not meet the quality requirements or needs very large clamp tonnage. However, despite the advantages of injection-compression molding, the compression stage also adds complexity to the process and makes the process more difficult to control. The article describes how during mold opening and closing, the thickness of the mold cavity is not known a priori. The article proposes a shooting algorithm, wherein reiterative molding cycles are carried out with adjustments and calculations performed between each cycle until the cavity force converges with the clamp force, to obtain the correct part thickness for each individual time step.

Several references, described below, provide examples of insert displacement.

U.S. Pat. No. 2,443,826 discloses inserts which are bolted directly to the clamp plates 16 and 25. The system relies on complete displacement of the inserts until reaching stops, or otherwise bottoming out. Once fully displaced, there is no means by which to monitor or control the internal cavity pressure, whereby the cavity behaves as a fixed volume, thereby simulating a straight compression molding operation.

Japanese Patent JP 60009722 shows a spring member behind one insert that is compressed upon activation of a hydraulic piston located behind the opposing insert. Rather than allowing for cavity enlargement, the piston actually reduces cavity volume as it closes the gates and moves the inserts toward each other against the biasing force of the spring.

U.S. Pat. No. 4,900,242 discloses a molding apparatus that utilizes a toggle clamp assembly or a floating die assembly to exert the same compressive force on multiple cavities simultaneously. Due to the large forces involved and the relative movement of multiple mold parts it is difficult to maintain a consistent mold volume. In addition, because of the large number moving parts, it is correspondingly more difficult to initially configure this equipment when changing inserts.

U.S. Pat. No. 5,015,426 discloses a center-gated mold for the manufacture of compact discs, e.g. CDs. Because of the uniform flow pattern from the gate, radially outward to the cavity edge, the mold is of relatively simple design with the inserts 10 and 11 resting directly on the clamp plates 21 and 25, respectively. Since CDs are made at only one uniform thickness, the mold is not configured to receive inserts having part-forming surfaces of varying curves or to receive inserts that would be set to different heights with respect to the mold parting line. By eliminating height adjustment and corresponding shimming requirements, the insert is able to displace a sensor which is housed directly behind it in the clamp plate.

SUMMARY OF THE INVENTION

The invention relates to a hardware configuration and related method for performing a coining-type injection compression operation. The invention is useful in molding lenses since lenses have different thicknesses at various points.

Initially, a standoff post is installed into one half of the moldset. The post is axially dimensioned to provide an insert support surface located a fixed distance from the mold parting line. The standoff post is designed with an internal compression member that admits to slight axial compression beyond a predetermined force value. The standoff post may be installed on the fixed mold half, the movable mold half, or both. For example, the standoff post may be installed on the movable mold half with a fixed height standoff post installed on the fixed mold half.

An insert is adjustably mounted on the support surface to obtain a target cavity thickness. Heated lens material is injected into the cavity until the internal cavity pressure exceeds the predetermined force value of the standoff post. This causes an expansion of the cavity thereby compressing the insert against the lens material. Expansion, following the axial compression of the standoff post, produces a coining operation without opening the mold. The compression of the insert maintains contact between the insert and the lens material as the lens material cools and shrinks.

The standoff post automatically returns the insert support surface to the initial location once the mold is opened after each part forming cycle. The initial location corresponds to the target cavity thickness. The axial compression is afforded by a highly force resistant compression member disposed within the standoff post. The standoff post includes a stationary bottom section that is bolted to the clamp plate and an axially deflectable top section, with the compression member sandwiched therebetween. The compression member is subject to compression at about 30,000 to 40,000 psi. For example, the compression member is subject to compression at about 36,000 psi. This corresponds to a predetermined force value that is on the order of, but slightly less than, the mold's multi-ton clamping force. The mold clamp provides a clamp force that exceeds the internal cavity force during the injecting step and during at least the initial phase of solidification of the lens material. The clamp force may be constant during the normally closed phase of the molding cycle.

Adjustably mounting the insert involves selectively placing shims between the support surface and the insert to axially displace the insert with respect to the parting line. Note the distance from the parting line to the support surface is relatively small, since the longer distance to the mold plate is occupied by the standoff post having a known height. Accordingly, different cavity thicknesses can be obtained with the same standoff post configuration. This is significant since semi-finished lenses are typically manufactured in a variety of thickness from about 8 mm to about 11 mm with the same finished curve on one side. In this manner, different cavity thicknesses can be obtained with the same standoff post configuration and the same insert by adjusting the thickness of shims disposed between the standoff post and the insert.

Adjustably mounting the insert step involves clamping the insert to the standoff post, for example, utilizing a quick release clamp, or a so-called SMED system. The quick release clamp extends through an aperture formed in the receiver and mold. The release clamp extends radially outwardly from the axial dimension. The aperture is elongated in the axial direction to provide clearance for the clamp to move axially with the insert. The insert is clamped to the top section for axial deflection therewith.

BRIEF DESCRIPTION OF THE DRAWINGS

The advantages, nature and various additional features of the invention will appear more fully upon consideration of the illustrative embodiments now to be described in detail in connection with the accompanying drawings. In the drawings, wherein like reference numerals denote similar components throughout the views:

FIG. 1 is a graph illustrating varying internal cavity force and a constant mold clamp force in a simplified coining operation according to the prior art.

FIG. 2 is a graph illustrating internal cavity force and stepwise-varying mold clamp force in an advanced coining operation, also according to the prior art.

DETAILED DESCRIPTION OF THE PREFERRED EMBODIMENTS

In general, injection-compression molding features a compression stage, where the inserts are compressed against the molding material as it cools. This compression helps mold replication by keeping the inserts in intimate contact with the molding material as it shrinks. Parts having different thicknesses across their profile, like ophthalmic lenses made from polycarbonate, will experience varying degrees of shrinkage based on thickness.

While compression helps improve mold replication, it creates a problem in controlling part thickness. The compression stage inherently changes the distance between inserts, thereby altering the target cavity thickness. One approach to managing this problem is to secure the inserts to the mold at the target cavity thickness. Then the entire mold half is displaced or slightly opened during in the coining operation, in a so-called clamp-end process.

Figure 3:
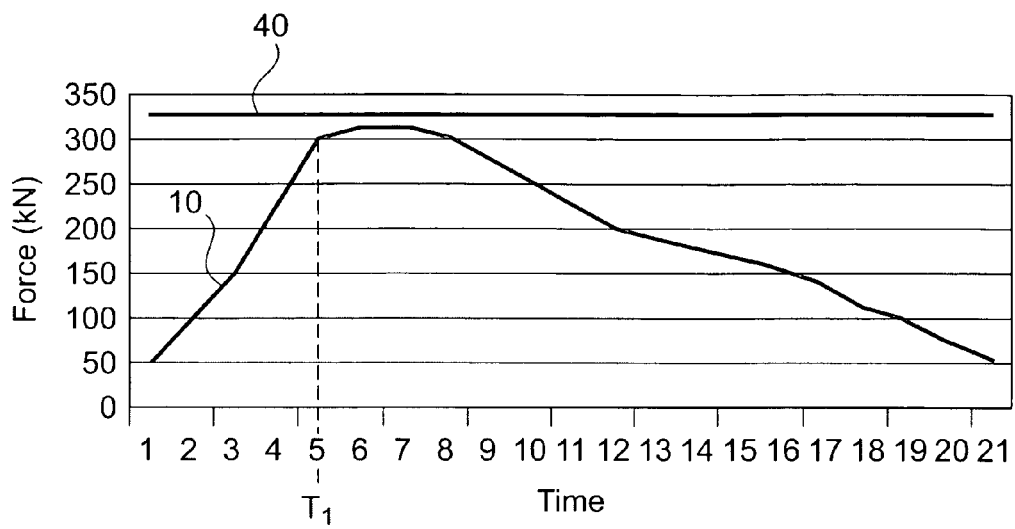
FIG. 3 is a graph illustrating internal cavity force and mold clamp force according to an embodiment of the invention.

Referring now in detail to the drawings, and in particular FIGS. 1, 2 and 3, there is shown a series of graphs all showing force along the vertical axis versus time across the horizontal axis. The horizontal axis shows unit time that is representative of the stages in one injection molding cycle. All of the graphs show a similar curve (10) representing internal cavity force, that is the force exerted by the molding material on the inserts. From the Fan article, we know that one method to calculate from is by integrating the cavity pressure across the mold to obtain the force that is exerted on the mold wall. Curve 10 is plotted alongside curves (20, 30 and 40) which represent the mold clamp force in each example, that is, the force exerted by the movable mold side against the stationary mold side. Typically the mold clamp force is at least 10 tons, and may be in the range of 100 tons or more. In the graphs, the mold clamp force is expressed in kN.

FIG. 1 is a simplified example of a coining operation, in which $T_1$ represents the time in which the cavity is nearly filled with molding material. At $T_1$ the internal cavity force 10 exceeds the mold clamp force, thereby opening the mold. As the molding material cools and shrinks, force curve 10 is reduced and the mold is able to close back down while maintaining the inserts in intimate contact with the now solidifying mold material. A problem exists with this simplified approach in that the compression force remains very high which can have a detrimental effect on portions of the part which cool at different rates.

FIG. 2 is an advanced coining process where the mold clamp force is reduced to better track the diminishing internal cavity force. Such a process is discussed in the Fan article as well as U.S. Pat. No. 5,417,899. Examples of the Clamp Force Profile set the initial clamp force 30a at 267 kN, the second stage 30b at 196 kN and the final stage 30c at 133 kN. However, this process requires a force convergence between the two curves at time $T_2$ which is difficult to calculate.

Two major drawbacks exist from the known advanced coining processes. First it is a complex process to setup and operate. Accordingly, changeovers from one part or lens to another, will always require a whole new initialization procedure. Second, equipment or operator error that causes an overfill condition can flash the mold. Flash is excess molding material spilling out of the insert perimeter in between the mold during mold opening. When the mold clamps back down with many tons of force, this excess molding material can damage the mold.

FIG. 3 illustrates an embodiment of the invention wherein the clamp force 40 is set above the highest internal cavity force 10. In this manner, the complex clamp force profile and convergence calculations are eliminated and the possibility of flash is greatly diminished, to the point of being practically eliminated.

As described above, the coining operation requires that the clamp force be precisely controlled at every point during the molding cycle. In contrast thereto, the invention provides a simplified method and apparatus, which allows the cavity to expand without having to open the mold. Accordingly, we define such an operation as an In-Mold Coining Operation. The operation includes maintaining the clamp force at a value, which exceeds the internal cavity force throughout periods of the molding cycle when the mold is typically closed. The clamp force may remain relatively constant as shown in FIG. 3, or may vary, as long as it exceeds the internal cavity force at all times.

The In-Mold Coining Operation is achieved by equipping the edge-gated mold with a standoff post that supports the insert and provides a host of features that shall be described in greater detail below. Functionally, the standoff post operates as a fixed, rigid platform for receiving the insert. The standoff post is capable of slight axial compression under a very high threshold force, for example, forces exceeding 10,000 psi.

Figure 4:
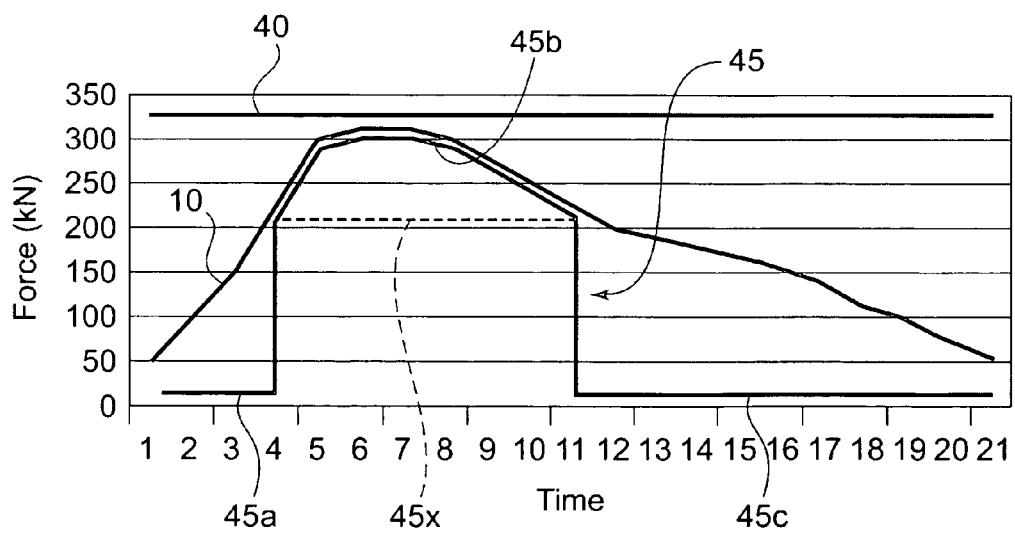
FIG. 4 is a graph illustrating internal cavity force and insert compression force according to an embodiment of the invention.

FIG. 4 adds a force curve 45 for the insert undergoing an In-Mold Coining Operation. Note that the initial portion of the curve 45*a* is flat, and near zero. In this region, during a partial fill condition of the cavity, the insert is passive. As the initial cavity volume is filled, and exceeded, to the point where the internal cavity force exceeds the threshold of the standoff post, the insert and standoff post are compressed, thereby enlarging the cavity. This threshold value is represented by the dotted line 45*x*. An important aspect of the invention is to provide a compression member that functions as a variable force compression member. That is, an increasing force is required to compress the member at each progressing stage. So, a first force will compress the member a first amount, but a second higher force is required to compress the member a further, but equal, amount.

FIG. 4 illustrates how the force of the compression member is equal and opposite to the internal cavity force. Accordingly, the standoff post of the invention, provides a self-adjusting capability. If the compression member has a geometric response curve, it would require a geometrically increasing force to effect the same degree of displacement, as the member is further and further compressed. The coining operation according to the prior art has no response curve, and the clamp force must be programmed with a force value for every point in the molding cycle. The invention provides an important feedback function, in that each instance of internal cavity force [exceeding the threshold] is automatically met by an equal opposing force from the compression member. This is represented by curve portion 45*b* above line 45*x*. As the molding material cools and shrinks, the compression member returns toward its initial starting displacement. Once it reaches its initial starting point, the compression force on the molding material drops to zero, shown as portion 45*c*.

Of course, it is also possible to configure the compression member with a pre-load, to start the molding process higher up the geometric response curve. In such circumstances, the flat portions 45*a* and 45*c* of the compression member force curve would extend horizontally at 100 kN, which may correspond to 5,000 psi, for example. Regardless of the pre-load, the insert exerts no pressure on the partially filling cavity.

Figure 5:
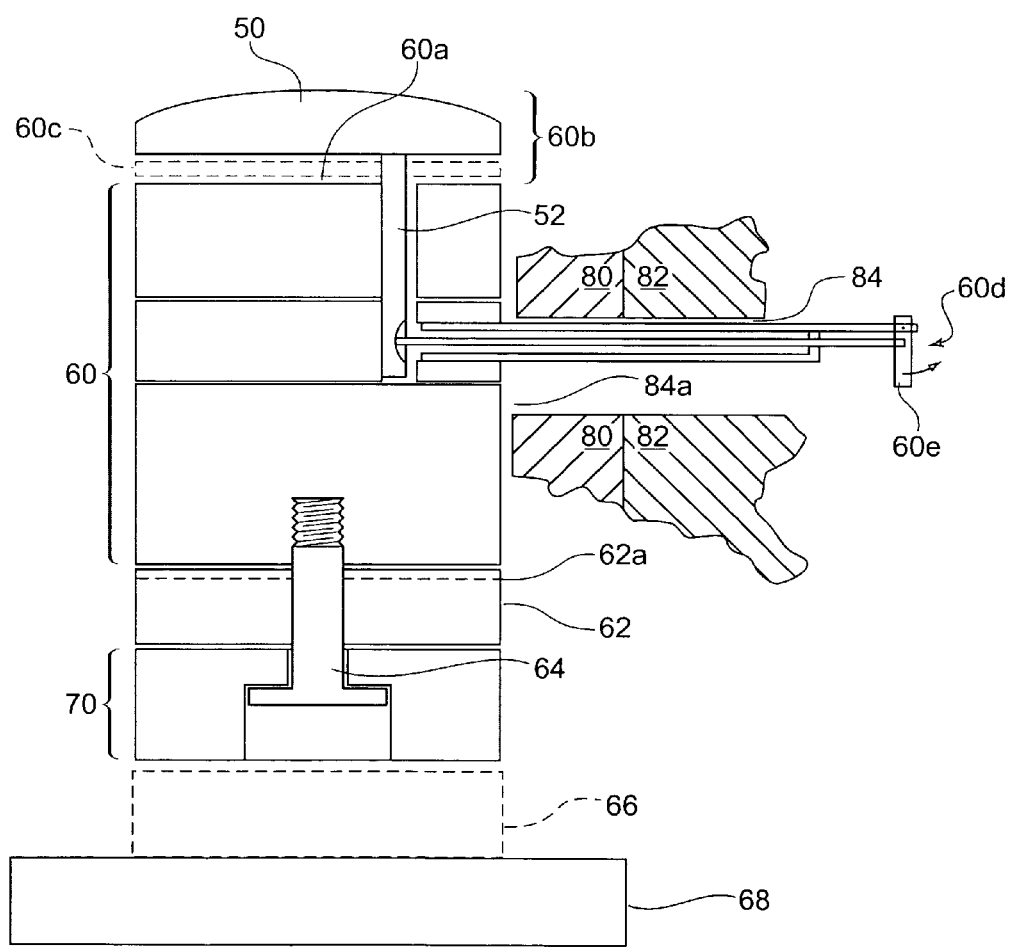
FIG. 5 is a schematic drawing showing the components according to an embodiment of the invention designed to perform an In-Mold Coining Operation.

Referring now to FIG. 5, there is shown the standoff post according to the invention, including upper body 60 and lower body 70. Lower body 70 is a stationary component that is keyed and bolted to clamp plate 68. One or more support plates 66 may be placed on clamp plate 68 to facilitate the connection or position. Upper body 60 includes a support surface 60*a* at its top end for receiving a post-mounted insert and a SMED connection assembly 60*d* which locks the insert post to upper body 60. A compression member 62 is disposed between upper body 60 and lower body 70. The upper and lower bodies are connected together by a bolt 64 which passes through the compression member 62. Bolt 64 is capable of sliding downwardly within lower body 70 due to the absence of threads near the bold head.

The entire standoff post from clamp plate 68 to support surface 60*a* provides a fixed platform that is set at a known distance 60*b* from the parting line, represented by the top of the bracket. In other words, the standoff post is a height adjusting tool that replaces the prior art practice of securing the insert assembly to the clamp plate with a threaded adjusting body. Typically, the threaded adjusting body is keyed and bolted to the clamp plate. By rotating the lower portion of the adjusting body, the upper portion carrying the insert can be drawn down into the receiver to adjust its position relative to the parting line. Since the threaded adjusting body must withstand the multi-ton clamping force, the threads are substantial making the adjustment unwieldy. The installation routine is cumbersome and inherently requires fine-tuning by the very act of removing and installing a new insert.

As can be appreciated, the standoff post of FIG. 5 provides a support surface 60*a* very near the parting line. The insert 50 can be installed on top of one or more shims 60*c* to readily adjust their location with respect to the parting line. The shims 60*c* have apertures through which an insert post 52 extends down to be locked in place via the SMED connector 60*d* with relative ease. Accordingly, the standoff post provides a structure to reduce the distance from the ultimate insert support surface to the parting line. Because of the streamlined insert installation process, the inserts can be shimmed and attached to a stub pin in a clean room. In other words, the standoff posts allows for insert calibration prior to insert installation. Furthermore the inserts can be pre-heated and connected via SMED 60*d* in a manner which substantially reduces machine downtime. SMED 60*d* is coupled by a hollow shaft to upper body 60 after passing through an aperture 84 formed within the mold wall 82 and the insert receiver 80. A rod then slides through the shaft to engage the lower end of post 52. The rod may be extended and retracted by a lever 60*e* which is accessible from outside the mold. The aperture 84 is elongated in the downward direction as indicated by reference numeral 84*a*. This provided clearance for the entire SMED connector 60*d* to move axially downward with the upper body 60.

Compression member 62 has the characteristics of requiring a very high force to admit deformation, resulting in downward, axial displacement of upper body 60, SMED and the insert. Compression member may be formed from one or more highly incompressible polymer materials, highly incompressible rubber or plastic, springs made of metal or other high strength materials. For example, Belleville springs made from tool steel may be utilized. A combination of springs and materials may be used to adjust the force-to-displacement characteristics of the compression member. In one embodiment, a Belleville washer is sandwiched between two flat metal washers made of stainless or tool steel. The flat washers provide a wear surface against which the inner and outer peripheries of the Belleville washer can slide under very high compressive loads without damaging upper or lower bodies 60 and 70. The compression of member 62, i.e. the reduction in height resulting from compression is illustrated schematically by dotted line 62*a*.

In a practical embodiment of the invention, a Belleville washer with a threshold force parameter of more than 20,000 psi is installed into the standoff post and bolted via bolt 64 to a pre-load representing a fraction of the threshold force. For example, a washer having a compressive force of between 30,000 and 40,000 psi may be used. For all intensive purposes, the assembled standoff post acts as a solid assembly to receive the insert. This simplifies installation of the standoff post, and creates a substantially rigid and fixed support surface 60*a*. In other words, for forces below 20,000 psi, as would be encountered in insert changeover, the post is essentially solid and stationary. As can be seen in FIG. 4, only at time unit 4 under nearly complete cavity filling, do the forces involved approach the compressibility threshold of the standoff post. As the internal cavity pressure exceeds the threshold, the insert is able to retract against the biasing force of the compression member thereby enlarging the cavity. In the case of a pre-load, bolt 64 opposes the force of the compression member. This corresponds to curve sections 45a and 45c. Once the curve exceeds line 45x, the opposing force is gradually transferred to the internal cavity force. In this manner, the cavity expands to the high temperature part volume without further operator input and without requiring further process adjustments even if the molding conditions change slightly over time. As the part cools and shrinks, around time unit 11, the opposing force is gradually transferred back to bolt 64.

For example, with a 20,000 psi Belleville washer the first millimeter of displacement may require 22,000 psi. The next millimeter of displacement may require 26,000 psi and a further millimeter displacement may require 34,000. In this way, enormous loads can be adsorbed in a self-adjusting manner while the probability of bottoming out the compression member is highly unlikely and can easily be guarded against. In other words, the compression member requires a force per unit of incremental compression that follows a non-linear curve. For example, the compression member may follow a geometric force curve. In another example, the compression member may follow an exponential force curve. By selection of an appropriate compression member, the axial displacement in section 45b may be adjusted according to coining requirements of the particular process. However, the self-adjusting force provided by the compression member that is equal and opposite of the internal cavity pressure will remain the same, as illustrated by the curve 45b tracking the internal cavity force curve 10.

Having described preferred embodiments for methods and apparatus used for In-Mold Coining operations (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of configuring a moldset and molding a lens by injection-compression, comprising the steps of:

installing a standoff post into a cylindrical receiver in one half of the moldset that is axially dimensioned to provide an insert support surface initially located a fixed distance from the mold parting line, the entire standoff post being remote from the parting line and admitting to axial compression beyond a predetermined force value;

adjustably mounting an insert into the receiver and onto the support surface to obtain a target cavity thickness, whereby the insert can be calibrated relative to the support surface to readily obtain different cavity thicknesses; and injecting lens material into the cavity until the internal cavity pressure exceeds the predetermined force value of the standoff post thereby compressing the insert independent of the receiver against the lens material to mold a lens.

2. The method of claim 1, wherein the axial compression of the standoff post produces a coining operation without opening the mold.

3. The method of claim 1, wherein the compression of the insert maintains contact between the insert and the lens material as the lens material cools and shrinks.

4. The method of claim 1, wherein the standoff post automatically returns the insert support surface to the initial location once the mold is opened after each part forming cycle.

5. The method of claim 4, wherein the initial location corresponds to the target cavity thickness.

6. The method of claim 1, wherein the axial compression is afforded by a compression member comprising a belleville spring disposed within the standoff post.

7. The method of claim 6, wherein the standoff post includes a stationary bottom section that is bolted to the clamp plate and an axially deflectable top section, with the compression member sandwiched therebetween.

8. The method of claim 7, wherein the compression member is subject to compression at about 30,000 to 40,000 psi.

9. The method of claim 6, wherein the amount of force per unit of incremental compression on the compression member follows a curve selected from the group of a non-linear curve, a geometric curve and an exponential curve.

10. The method of claim 6, wherein during compression, the compression member provides a self-adjusting force that is equal to, and opposite of, the internal cavity pressure.

11. The method of claim 1, wherein the predetermined force value is less than the mold's clamping three.

12. The method of claim 1 whereby different cavity thicknesses can be obtained with the same standoff post configuration.

13. The method of claim 12, whereby different cavity thicknesses can be obtained with the same standoff post configuration and the same insert by adjusting the thickness of shims disposed between the standoff post and the insert.

14. The method of claim 13, wherein lenses having a center thickness of about 8 mm to about 11 mm are formed.

15. The method of claim 1, wherein said adjustably mounting step comprises clamping the insert to the standoff post.

16. The method of claim 1, wherein, said adjustably mounting step comprises quick release clamping the insert to the standoff post so that the insert can be secured in the absence of threaded adjusting bodies.

17. The method of claim 16, wherein the quick release clamp extends from outside the mold through an aperture formed in the receiver and mold.

18. The method of claim 17, wherein the release clamp extends radially outwardly from the axial dimension.

19. The method of claim 18, wherein the aperture is elongated in the axial direction to provide clearance for the clamp to move axially with the insert.

20. The method of claim 7, wherein the insert is clamped to the top section for axial deflection therewith.

21. The method of claim 1, further comprising the step of:
   providing, a clamp force that exceeds the internal cavity force during the injecting step and during at least the initial phase of solidification of the lens material.

* * * * *

UNITED STATES PATENT AND TRADEMARK OFFICE
CERTIFICATE OF CORRECTION

PATENT NO.        : 7,763,191 B2                                        Page 1 of 1
APPLICATION NO. : 11/140435
DATED             : July 27, 2010
INVENTOR(S)       : Russell F. Weymouth, Jr.

It is certified that error appears in the above-identified patent and that said Letters Patent is hereby corrected as shown below:

Column 8, line 29 (Claim 11, line 2) delete "three" and insert --force--.

Column 8, line 41 (Claim 16, line 1) delete the "," following "wherein".

Column 8, line 56 (Claim 21, line 2) delete the "," following "providing".

Signed and Sealed this

Fifth Day of October, 2010

David J. Kappos
*Director of the United States Patent and Trademark Office*